Patented May 19, 1936

2,040,857

UNITED STATES PATENT OFFICE 2,040,857

ACYLAMINO DERIVATIVES OF THE ANTHRAPYRIMIDINE SERIES

Max Albert Kunz, Mannheim, and Karl Koeberle, Ludwigshafen-on-the-Rhine, Germany, assignors to General Aniline Works, Inc., New York, N. Y., a corporation of Delaware No Drawing. Application January 14, 1932, Serial No. 586,692. In Germany January 21, 1931

35 Claims. (Cl. 260—32)

The present invention relates to new compounds which are acylamino derivatives of the anthrapyrimidine series, and process of producing same.

We have found that anthrapyrimidines to which an organic radicle is attached by means of an acylamino, in particular a carboxylamino group, are valuable coloring matters, in particular vat dyestuffs, and intermediate products for the preparation thereof and may also be used as pigments. The said anthrapyrimidine derivatives can be produced by condensation of an acylaminoanthraquinone containing a further nitrogen atom in an alpha position and convertible into anthrapyrimidines with compounds capable of forming the pyrimidine ring, for example acid amides, or ammonia in case acylaminoanthraquinone-1(N).2-oxazoles are employed as initial materials, whereby the pyrimidine ring is formed, or by acylation of aminoanthrapyrimidines, or by condensation of negatively substituted anthrapyrimidines with acid amides. They may further be prepared by condensing 1-nitroanthraquinone carboxylic or sulphonic acids or halides thereof with amines, reducing the nitro group and condensing the reduction products with acid amides to form the pyrimidine ring. Several of the aforesaid methods may also be combined.

For example by heating 1-amino-5-benzoyl-aminoanthraquinone with formamide, 5-benzoyl-amino-1.9-anthrapyrimidine is obtained according to the following formulae:—

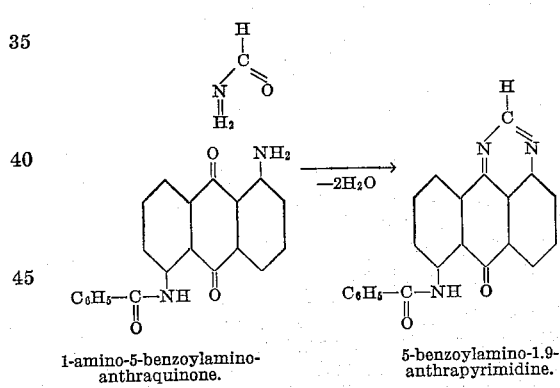

1-amino-5-benzoylamino-anthraquinone.      5-benzoylamino-1.9-anthrapyrimidine.

By acylating 4-amino-1.9-anthrapyrimidine by means of a carboxylic acid halide of the formula X—CO—R, wherein X is halogen and R an organic radicle, according to the following formulae:—

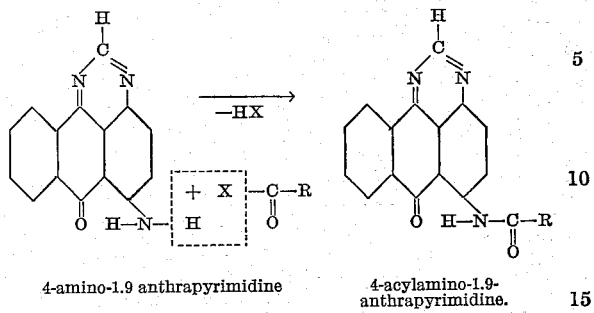

4-amino-1.9 anthrapyrimidine      4-acylamino-1.9-anthrapyrimidine.

4-acylamino-1.9-anthrapyrimidine is obtained. Finally by condensing for example 5-halogen-1.9-anthrapyrimidine with benzamide, 5-benzoylamino-1.9-anthrapyrimidine is obtained according to the following formulae:—

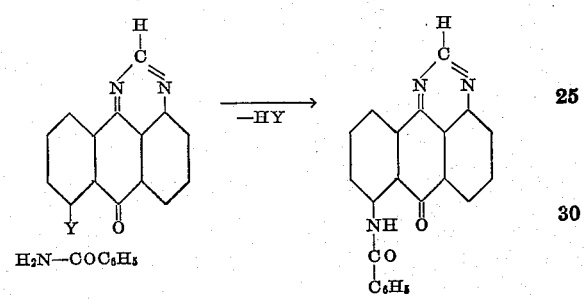

(Y being a halogen)

As results from the aforedescribed methods of producing the new derivatives of anthrapyrimidine, most various kinds of initial materials may be used, for example amino-anthrapyrimidines, halogenanthrapyrimidines, α-aminoanthraquinones substituted by a further amino group or halogen and α-nitroanthraquinone carboxylic and sulphonic acids and substitution products thereof. When starting from aminoanthrapyrimidines or α-aminoanthraquinones containing a further amino group and subsequently forming the pyrimidine ring, the new compounds are formed by condensation with organic acids whereby in case such acids of higher molecular weight are used, these are preferably employed in the form of their anhydrides or still better in the form of their halides, in particular chlorides. Halogenanthrapyrimidines or the corresponding α-aminohalogenanthraquinones, when used as starting materials, are to be condensed with the amides of the organic acids. In the following we will give a series of organic acids which either in the free state or in the form of their amides, anhydrides or halides have proved suitable for the purpose of our invention: aliphatic mono- and poly-carboxylic acids, such as formic, acetic, chloracetic, butyric, propionic, valeric, palmitic, stearic, oxalic, molanic, succinic, adipic, suberic, pyroacemic, lactic, citric, maleic, oleic acids cycloaliphatic acids, such as hexa-hydrobenzoic acid and naphthenic acids; aromatic carboxylic and sulphonic acids for example benzene mono and poly-carboxylic- and sulphonic acids, such as benzoic, phthalic, isophthalic and terephthalic acids, the various mono- and poly-carboxylic and sulphonic acids derived from naphthalene, anthracene, anthraquinone, fluorene, fluorenone, phenanthrene, benzanthrone, anthanthrone, the various dianthrones, ms-benzdianthrone, ms-naphthodianthrone, ms-anthradianthrone, the said acids of the heterocyclic series, such as those derived from pyridine, quinoline, acridine, acridone, anthraquinone-benzacridone, anthraquinonethioxanthrone, pyrazolanthrone, anthrapyrimidone, anthrapyridone and pyrolanthrone. Substitution products of the aforesaid acids may be used as well, for example their alkyl, aryl and acyl derivatives, such as toluic acids, xylene carboxylic acids, mesitylenic acid, cinnamic acid, hydrocinnamic acid, benzoyl-formic acid, benzoyl-acetic acid, acetyl-benzoic acid, diphenylcarboxylic acid, diphenylmethane carboxylic acid, benzophenone carboxylic acid, anthraquinonoyl-benzoic acid. Moreover, the halogen derivative of the aforesaid acids, viz. their fluorine, chlorine, bromine and iodine derivatives, the aforesaid acids when substituted by nitro, hydroxy, alkoxy, aryloxy or amino groups or amino groups in which the hydrogen atoms are replaced by organic radicals, such as alkyl, aryl or acyl groups, may be used. Further, there may be used acids of the aforedescribed kind when substituted by cyano, thiocyano, mercapto or substituted mercapto groups, viz. the thiocyanates and thioethers, or acids containing a further carboxylic group which is esterified or in which the hydroxy group is replaced by the amino group. When it is intended to produce compounds of the kind described in which the acyl group is attached to the anthrapyrimidine nucleus which as stated above are preferably prepared by condensing an α-nitroanthraquinone carboxylic or sulphonic acid chloride with amines, reducing the nitro group and condensing the amino body formed with an acid-amide to form the pyrimidine ring, as amines all compounds corresponding to the aforesaid acids but containing an amino group instead of the acid group, may be used. By appropriate selection of the reaction conditions, several different acylamino groups may also be introduced into the anthrapyrimidine molecule.

The anthrapyrimidines or the corresponding anthraquinones which are used in the preparation of the new compounds, may contain any of the substituents which as stated above may be present in the acid component, also connected to the Py-C atom, in particular halogen, alkyl, aryl, aralkyl, amino, substituted amino, hydroxy, alkoxy, nitro and cyano groups. In addition to the said substituents the 2-position in the anthrapyrimidine may be substituted by a 2-anthrapyrimidine radical. That is to say the invention includes the production of acylamino compounds of 2-2'-dianthrapyrimidyls which latter products are obtainable by alkaline condensation of anthrapyrimidines. As substituents in the Py-C position, alkyl, aryl, aralkyl, amino, substituted amino, alkoxy and aryloxy groups and in particular halogen are valuable. The aforesaid anthrapyrimidines substituted on the Py-C atom by organic radicals may be produced by employing another acid amide than formamide, for example acetic amide, for the condensation with an alpha-aminoanthraquinone. It is, however, more suitable to produce these substituted anthrapyrimidines from the corresponding anthraquinone-1(N).2-oxazoles by heating them with ammonia under pressure. A further convenient method for producing these substituted anthrapyrimidines consists in starting from anthrapyrimidones which may already contain an acylamino, amino, nitro, alkyl, alkoxy, aryloxy group or a halogen atom in the anthraquinone nucleus, with agents capable of replacing oxygen or hydroxy groups by halogen, such as the halides of phosphorus or sulphur, for example phosphorus pentachloride, tribromide, trichloride, thionyl chloride and the like, or benzotrichloride, antimony pentachloride and arsenic pentachloride. In the Py-C-halogenanthrapyrimidines thus obtained the halogen atom can readily be replaced by organic radicals either directly by condensation with amino or hydroxy compounds, or by way of the corresponding diazo compounds which may be obtained from the amines prepared from the halogen compounds by heating them with ammonia. By way of the diazo compounds other substituents, such as mercapto, cyano and like substituents, can readily be introduced into the Py-C position of the anthrapyrimidines.

The preparation of the acylaminoanthrapyrimidines by condensation of aminoanthrapyrimidines with organic acids, anhydrides or halides, or halogenanthrapyrimidines with acid amides, and the corresponding condensation of the aminoanthraquinones or halogenanthraquinones with organic acids, anhydrides or halides, or acid amides, before the formation of the pyrimidine ring, is best carried out in an inert organic solvent or diluent, in particular aromatic solvent or diluent of high boiling point, for example nitrobenzene, halogenbenzenes, nitro and halogen derivatives of homologues of benzene, naphthalene and its halogen derivatives and the like. The condensation is best carried out at temperatures above 100° C. and may be accelerated by the addition of condensing catalysts, such as metal and metal compounds, for example copper and iron, their oxides and salts thereof, such as their acetates and carbonates. Acid binding agents are also preferably added, for example pyridine, quinoline, tertiary organic bases, such as dimethylaniline, sodium and potassium carbonates, acetates and phosphates. The formation of the pyrimidine ring when starting from anthraquinones can be carried out in the absence as well as in the presence of indifferent diluents, for example phenol, nitrobenzene, trichlorbenzene or in the case of anthraquinone-1(N).2-oxazoles water or alcohol may be used as diluents. Agents which accelerate reaction, for example anhydrous boric oxide, oxalic acid, potash, zinc chloride, copper and its salts, may be added. The reaction products are usually obtained in good yields and in a crystalline form. If necessary they may be purified by the usual methods, as for example by crystallization or treatment with oxidizing agents, for example in the form of their aqueous pastes with hypochlorite solution. They dissolve in concentrated sulphuric acid, usually to give a yellow to orange coloration. They are comparatively difficultly soluble in the usual organic solvents and, contrasted with the anthrapyridones and anthrapyrimidones, are insoluble in alkalies. With alkaline hydrosulphite solutions they usually yield violet brown vat solutions from which vegetable, animal and artificial fibres are usually dyed greenish yellow to violet shades.

The shades produced with the acylaminoanthrapyrimidines prepared in the aforesaid manner may be varied by halogenation.

The halogenation may be carried out by a variety of methods, as for example in inorganic or organic media, such as sulphuric acid and its derivatives, for example chlorsulphonic, and alkylsulphonic acids, water, nitrobenzene, chlorbenzene and the like, or in the absence of diluents, or in the presence of halogen transferrers, as for example iodine, sulphur, iodine chloride, selenium, dimethylaniline, antimony, iron, iron chloride and aluminium chloride. The reaction products are usually obtained in good yields and in a good state of purity; when necessary they may be purified by the usual methods, as for example by crystallization, by boiling with organic solvents or by treatment with alkali metal hypochlorites or other oxidizing agents. The halogenacylaminoanthrapyrimidines differ from the initial materials free from or poor in halogen usually as regards shade of color and are in part superior thereto as regards fastness to washing and chlorine. Thus for example, from 5-benzoylamino-1.9-anthrapyrimidine (which gives yellow dyeings) a clear orange is obtained by chlorination and from the acylamine derived from 4-amino-1.9-anthrapyrimidine and diphenyl-4-carboxylic acid (which gives greenish yellow dyeings) a halogenation product which gives clear greenish yellow dyeings is obtained by treatment with bromine or sulphuryl chloride, the said product being completely fast to chlorine in contrast to the initial material and superior to the latter as regards fastness to washing, kier boiling and light.

The following examples will further illustrate the nature of this invention but the invention is not restricted to these examples. The parts are by weight.

*Example 1*

36 parts of 1-amino-4-benzoylaminoanthraquinone are heated to from 180° to 185° C. with 125 parts of formamide for 8 hours while stirring. After cooling the reaction product is filtered by suction, washed with alcohol and dried. The reaction product obtained in the form of yellow needles in good yields dissolves in concentrated sulphuric acid giving an orange coloration. It crystallizes from nitrobenzene, if necessary with the addition of a little benzoyl chloride, in the form of green yellow needles. The 4-benzoylamino-1.9-anthrapyrimidine with alkaline hydrosulphite yields a violet brown vat solution from which cotton is dyed powerful clear green yellow shades of very good fastness. A brown ammoniacal vat yields powerful brilliant green yellow shades on wool.

The reaction may also be carried out in the presence of diluents, as for example phenol. The product is identical with the reaction product obtainable from 4-amino-1.9-anthrapyrimidine (obtainable by boiling 1.4-diaminoanthraquinone with formamide in phenol) with benzoyl chloride. A reaction product of similar color is likewise obtained from 4-chlor-1.9-anthrapyrimidine by heating with benzamide.

*Example 2*

5 parts of 4-amino-1.9-anthrapyrimidine are suspended in 100 parts of nitrobenzene. After adding 6 parts of 1-aminoanthraquinone-2-carboxylic acid chloride, the whole is heated to 120° C. for several hours while stirring, then for a short time at 150° C. and then for from 1 to 2 hours at the boiling point. The whole is allowed to cool and the reaction product which separates in the form of yellow red needles is filtered off by suction. The yield is almost theoretical. The product dissolves in concentrated sulphuric acid giving an orange coloration, yields a dark brown vat and dyes cotton red shades having very good fastness.

The corresponding acylamine from 4-amino-1.9-anthrapyrimidine and anthraquinone-2-carboxylic acid dyes green yellow shades as does that with pyrazolanthrone-2-carboxylic acid and also the meta-methoxy-4-benzoylamino derivative.

*Example 3*

1 part of 1-amino-5-benzoylaminoanthraquinone, 2 parts of formamide and 4 parts of phenol are boiled for several hours while stirring. When the solution has become orange yellow in color, it is allowed to cool, diluted with from 6 to 7 parts of ethyl alcohol, allowed to cool and the reaction product which separates in a crystalline form is filtered off by suction. It crystallizes from nitrobenzene, preferably with an addition of a little benzoyl chloride, in the form of yellowish needles of 5 - benzoylamino - 1.9 - anthrapyrimidine. It dissolves in concentrated sulphuric acid giving an orange coloration and yields clear yellow dyeings of good fastness from a brown vat.

*Example 4*

24,7 parts of 5-methylamino-1.9-anthrapyrimidine (obtainable by heating 5-chlor-1.9-anthrapyrimidine which may be prepared from 1-chlor-5-aminoanthraquinone with formamide, with methylamine under pressure) are heated at between 140° to 150° C. with 120 parts of parachlorbenzoylchloride until the reaction mass has become orange. The whole is then allowed to cool an worked up as usual. The reaction product obtained is a dark brown powder, dissolves in centrated sulphuric acid, gives a yellow solution with an olive tinge and dyes current shades from a brown vat.

In the same manner 5-ethyl and 5-propylamino-1.9-anthrapyrimidine which are obtainable from 5-chlor-1.9-anthrapyrimidine by means of ethyl or propylamine, may be subjected to acylation.

Similar reaction products are obtained in an analogous manner by starting from alkylation products of aminoanthrapyrimidines obtained in sulphuric acid by means of alcohols.

*Example 5*

5 parts of 4-amino-1.9-anthrapyrimidine in 50 parts of ortho-dichlorbenzene are heated to boiling, after the addition of 10 parts of parachlorbenzoyl chloride, and the whole is boiled until there is no further lightening in color, which is usually the case after a few hours. The whole is then allowed to cool and the reaction product which separates in a theoretical yield in the form of lustrous crystal spangles is filtered off by suction. It dissolves in sulphuric acid giving a golden yellow coloration, crystallizes in the form of needles and yields in violet brown vat from which vegetable and animal fibres are dyed clear green yellow shades of good fastness and excellently fast to washing.

Reaction products which crystallize well and yield green yellow dyeings are likewise obtained in quantitative yields from 4-amino-1.9-anthrapyrimidine and ortho-chlorbenzoyl chloride or 2.4-dichlorbenzoyl chloride.

The corresponding condensation product from 5-amino-1.9-anthrapyrimidine and ortho-chlorbenzoyl chloride gives reddish yellow dyeings.

The acylamine obtainable from anthrapyrimidine by nitration by means of nitric acid in sulphuric acid, reduction of the nitro compound to the amine and treatment of the amino compound with para-chlorbenzoyl chloride dyes cotton yellow shades.

Example 6

247 parts of 4-amino-1.9-anthrapyrimidine in 2000 parts of ortho-dichlorbenzene are heated slowly while stirring after the addition of 500 parts of meta-methoxybenzoyl chloride, and then boiled for a short time. The reaction product which separates in a crystalline form in excellent yields is filtered off by suction an may be crystallized from trichlorbenzene. It dissolves in concentrated sulphuric acid giving an orange coloration, and gives a violet red brown vat from which cotton is dyed powerful green yellow clear shades of very good fastness.

The condensation product with beta-naphthoyl chloride (yellow needles) also dyes cotton greenish yellow shades from a red brown vat. The acylamine from 2 molecular proportions of 4-aminoanthrapyrimidine and 1 molecular proportion of isoterephthaloyl chloride also gives yellow dyeings.

Example 7

2 parts of 4-amino-1.9-anthrapyrimidine in 40 parts of trichlorbenzene are heated to boiling for several hours while stirring after the addition of 10 parts of acetic anhydride. The whole is then allowed to cool and is worked up in the usual manner. The acetyl derivative obtained forms yellow crystals, dissolves in concentrated sulphuric acid giving a golden yellow coloration and yields comparatively pale green yellow dyeings on cotton and wool from an orange vat.

A green yellow reaction product the acetyl-p-chlorbenzoyl-amino derivative, is obtained therefrom by treatment with para-chlorbenzoyl chloride. It dissolves in concentrated sulphuric acid giving a golden yellow solution, and furnishes a brown-violet vat.

The product from 4-amino-1.9-anthrapyrimidine and oxalyl chloride is a green yellow crystalline powder which is very difficultly soluble. The reaction product of the above amino compound with chlorcarbonic acid ethyl ester is also yellow as is also the reaction product with phosgene or thiophosgene or perchlormethyl mercaptan.

Example 8

65 parts of 2-amino-C-phenyl-1.9-anthrapyrimidine (obtainable from C-phenylanthraquinone-2.1-oxazole by treatment with ammonia according to the following formulæ:

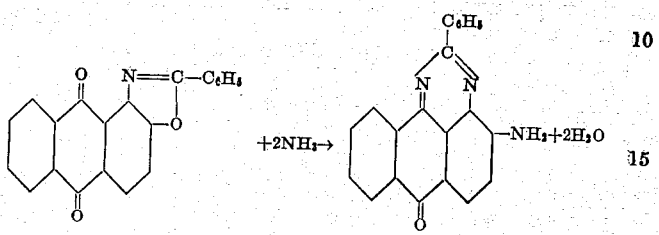

1000 parts of nitrobenzene and 58 parts of anthraquinone-2-carboxylic acid chloride are heated to boiling for some hours while stirring until the reaction mixture, which is originally orange red, has become yellow, allowed to cool and the reaction product which separates in excellent yields in a crystalline form is filtered off by suction. It dissolves in concentrated sulphuric acid giving a golden yellow coloration and dyes cotton green yellow shades of good fastness from a brown vat. The reaction proceeds according to the following formulæ:

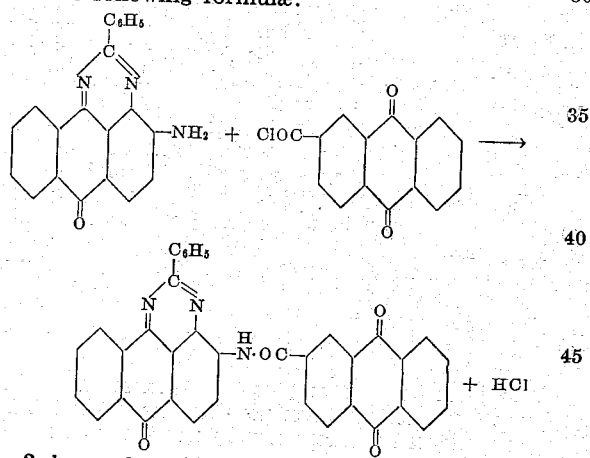

2-benzoylamino-C-phenyl-1.9-anthrapyrimidine forms yellow needles and dissolves in concentrated sulphuric acid giving a golden yellow coloration.

The reaction product of anthraquinone-2-carboxylic acid chloride on amino-1.9.4.10-anthradipyrimidine (obtainable from 1.9.4.10-anthradipyrimidine (obtainable from 1.5-diaminoanthraquinone) by nitration by means of a mixture of nitric and sulphuric acids and reduction of the nitro compound) is also a yellow crystalline powder which dissolves in concentrated sulphuric acid giving an orange coloration.

2-benzoylamino-1.9-anthrapyrimidine and 2-anthraquinone-beta-carboxylamino-1-9-anthrapyrimidine (obtainable from anthraquinone-2.1-oxazole by treatment with ammonia and conversion of the 2-amino-1.9-anthrapyrimidine formed with 2-anthraquinone carboxylic acid chloride) yield pale yellow dyeings on cotton from orange brown vats.

Example 9

30 parts of chlor-4-amino-1.9-anthrapyrimidine (prepared from 4-amino-1.9-anthrapyrimidine by treatment with chlorine in chlorsulphonic acid in the presence of iodine and sulphur as transferrers) in 500 parts of naphthalene are heated to boiling, after the addition of 100 parts of benzamide, 60 parts of potash and 3 parts of copper oxide, while stirring until there is no further formation of dyestuff. The whole is then allowed to cool and is worked up in the usual manner. The resulting reaction product is an olive yellow powder, dissolves in concentrated sulphuric acid giving an orange coloration and dyes cotton yellow from a violet brown vat.

By treating the reaction product with para-chlor-benzoyl chloride, a benzoylamino-para-chlorbenzoylamino-1.9-anthrapyrimidine giving yellow dyeings is obtained.

*Example 10*

247 parts of 4-amino-1.9-anthrapyrimidine are boiled for a short time in 2500 parts of nitrobenzene with 220 parts of orthotoluylchloride while stirring. The mass is allowed to cool and filtered by suction. The resulting reaction product which is a crystalline yellow powder dissolves in concentrated sulphuric acid to give an orange solution, furnishes a dark violet brown vat and crystallizes from organic solvents of high boiling point in the form of yellow needles. From the vat it dyes animal and vegetable fibres strong brilliant greenish yellow shades of excellent fastness to washing and boiling.

In an analogous manner similar reaction products which mostly dye yellow shades are obtained from 4-amino-1.9-anthrapyrimidine and other carboxylic acids, for example the para-cyanbenzoyl-4-amino-1.9-anthrapyrimidine, the para-fluorobenzoyl-4-amino-1.9-anthrapyrimidine (yellow needles), para-methoxybenzoyl-4-amino-1.9-anthrapyrimidine and the corresponding methoxy derivative, meta-methylbenzoyl-4-amino-1.9-anthrapyrimidine, 3.4-dichlorobenzoyl-4-amino-1.9-anthrapyrimidine and the corresponding 2.5- and 2.3-dichloro derivatives, 3.4.5-trichlorobenzoyl-4-amino-1.9-anthrapyrimidine, and also the corresponding cinnamoyl derivative.

*Example 11*

125 parts of 4-amino-1.9-anthrapyrimidine are boiled for a short time in 1250 parts of nitrobenzene with 125 parts of para-nitrobenzoylchloride while stirring. The reaction product is filtered off by suction after cooling. It is obtained in the form of yellow needles and in a nearly quantitative yield. It dissolves in concentrated sulphuric acid giving an orange solution and dyes cotton strong yellowish brown shades from a dark brownish violet vat.

The para-methyl-meta-nitrobenzoyl derivative prepared in an analogous manner is in the form of yellow needles. It dyes strong clear yellow shades. Meta-nitrobenzoyl-4-amino-1.9-anthrapyrimidine dyes orange yellow shades.

*Example 12*

250 parts of 4-amino-1.9-anthrapyrimidine are boiled in 3000 parts of nitrobenzene with 145 parts of diphenyl-para-para'-di-carboxylic acid chloride while stirring, until no more dyestuff is formed. The mass is allowed to cool and worked up in the usual manner. The reaction product of which an excellent yield is obtained, is in the form of yellow needles, dissolves in concentrated sulphuric acid giving an orange solution and dyes cotton yellow shades of excellent fastness from a dark violet vat. The crude product may be purified by treating an aqueous paste thereof with aqueous sodium hypochlorite solution.

The corresponding derivative of benzophenone-para-para'-dicarboxylic acid obtained in an analogous manner is in the form of yellow needles and dyes cotton greenish yellow shades from a brownish violet vat. Similar shades are obtained from the corresponding derivatives of diphenyl-mono-carboxylic acid or of naphthalene-1.4-dicarboxylic acid or naphthalene-1.5-dicarboxylic acid or of diphenyl-ether carboxylic acids, or of diphenylsulphide or phenylsulphide carboxylic acids.

*Example 13*

360 parts of para-aminobenzoyl-4-amino-1.9-anthrapyrimidine (obtainable by reducing the para-nitrobenzoyl-4-amino-1.9-anthrapyrimidine described in Example 11) are boiled for a short time in 3000 parts of nitrobenzene with 170 parts of benzoyl chloride while stirring. The reaction product is filtered off by suction after cooling. The resulting (para-benzoylamino-benzoyl)-4-amino-1.9-anthrapyrimidine which is obtained with a very good yield and in a state of high purity, crystallizes in yellow needles which dissolve in concentrated sulphuric acid giving an orange solution and dye cotton powerful clear yellow shades of excellent fastness from a warm violet brown vat.

Reaction products dyeing similar shades are obtained by employing, instead of benzoyl chloride, in an analogous manner para-chlorobenzoyl-chloride or 2.5-dichlorbenzoyl chloride or oxalyl chloride or meta-methoxybenzoyl chloride.

The acylamine obtained from para-aminobenzoyl-4-amino-1.9-anthrapyrimidine and anthraquinone-beta-carboxylic acid in an analogous manner dyes yellow shades. Use may also be made of carboxylic acids having a still higher molecular weight, as for example carboxylic acids derived from thiazolanthrone, benzanthrone or anthraquinone-thioxanthone. Carboxylic acids from anthrapyrimidine, as for example 1.9-anthrapyrimidine-2-carboxylic acid (obtainable from 1-aminoanthraquinone-2-carboxylic ethyl ester and formamide and saponification of the resulting anthrapyrimidine-2-carboxylic ester melting above 360° C.) may also be employed.

*Example 14*

250 parts of 5-amino-1.9-anthrapyrimidine (bluish red needles obtainable by saponifying the 5-benzoylaminoanthrapyrimidine described in Example 3) are boiled for a short time in 5000 parts of nitrobenzene with 250 parts of para-chlorobenzoyl chloride while stirring. The reaction product is filtered off by suction after cooling. It crystallizes in yellow needles and dyes cotton clear greenish yellow shades of excellent fastness from a brownish violet vat.

*Example 15*

24.7 parts of 7-amino-1.9-anthrapyrimidine (obtainable by the reaction of formamide on 1-aminoanthraquinone-7-sulphuric acid and replacing the sulphuric acid group by the amino group) are heated for a short time to boiling while stirring in 250 parts nitrobenzene with 20 parts of benzoyl chloride, the reaction mixture then being worked up as usual. The reaction product obtained in the form of yellow needles yields green yellow dyeings of very good fastness, in particular against washing, on cotton from a dark violet brown vat.

The acyl compound obtained in an analogous manner from 4-amino-1.9-anthrapyrimidine and para-brombenzoic acid dyes strong brilliant greenish yellow shades. Yellow dyeings are also obtained by the products produced from para-iodbenzoyl chloride or brom-1-naphthoyl chloride (obtainable by brominating α-naphthoic acid in glacial acetic acid and heating the product with thionyl chloride) and 4-amino-1.9-anthrapyrimidine. Yellow orange or red shades are produced by the acyl compounds produced from 4-amino-1.9-anthrapyrimidine and the chlorides of sebacic, adipic, stearic, pyroracemic, hexahydrobenzoic, benzanthrone - 2 - carboxylic, anthraquinone-1-carboxylic, salicylic, cresotinic, 2.4.5-trichlorbenzoic, diphenyl carboxylic, diphenylmethane carboxylic, anthanthrone carboxylic and allo - ms - naphthodianthrone carboxylic acid. The acyl compound of the said anthrapyrimidine and 2-aminoanthraquinone - 3 - carboxylic acid chloride dyes brown shades. A yellow dyeing reaction product is obtained from 1 molecular proportion of phosgene, 1 molecular proportion of β-aminoanthraquinone and 1 molecular proportion of 4-amino-1.9-anthrapyrimidine.

Instead of 7-amino-1.9-anthrapyrimidine mentioned in the first paragraph of this example its substitution products, for example its halogen and methyl derivatives can be subjected to benzoylation, the products obtained likewise dye yellow shades.

Example 16

250 parts of 5-amino-1.9-anthrapyrimidine are heated to boiling for a short time in 5000 parts of nitrobenzene with 110 parts of isophthaloylchloride. The yellow crystalline reaction product obtained by filtration of the reaction mixture dissolves in concentrated sulphuric acid to give an orange red solution and crystallizes from organic solvents of high boiling point. It dyes cotton strong golden yellow shades of very good fastness from a red vat having a violet tinge.

Dyestuffs furnishing similar shades and having similar properties are obtained by the use of terephthaloyl chloride or the mixture of iso- and terephthaloyl chloride. Dyestuffs dyeing more greenish yellow shades are obtained by employing succinic, adipic or sebacic acid chloride as acylating agent. The acylamino derivatives obtained by means of diphenyl p.p'-dicarboxylic and benzophenone-p.p'-dicarboxylic acid chloride dye cotton orange or golden yellow shades.

Example 17

250 parts of 5-amino-1.9-anthrapyrimidine are heated while stirring for a short time to boiling in 4000 parts of nitrobenzene with 260 parts of para-brombenzoyl chloride. The reaction product, para-brombenzoyl-5-amino-1.9-anthrapyrimidine, obtained by filtration of the reaction mixture after cooling and working up as usual, crystallizes from trichlorbenzene in small yellow needles dissolving in concentrated sulphuric acid to a red solution. Greenish yellow dyeings of good fastness are obtained with the said product from a red vat with a violet tinge.

Similar dyeings are obtained from para-iodbenzoyl-5-amino-1.9-anthrapyrimidine, para-cyanbenzoyl-5-amino-1.9-anthrapyrimidine the ortho - chlorbenzoyl - 5 - amino - 1.9 - anthrapyrimidine and the meta chlorbenzoyl-5-amino-1.9-anthrapyrimidine. Slightly more greenish shades furnish the 2'.4'-dichlorbenzoyl, the 3'.4'-dichlorbenzoyl and in particular the 2'.5'-dichlorbenzoyl - 5 - amino - 1.9 - anthrapyrimidine. The para-methylbenzoyl and β-naphthoyl-5-amino - 1.9 - anthrapyrimidines furnish orange dyeings. The para-phenylbenzoylamine derivative dyes strong reddish yellow shades.

Example 18

25 parts of 5-amino-1.9-anthrapyrimidine are heated to boiling for a short time in 500 parts of nitrobenzene with 30 parts of anthraquinone-2-carboxylic acid chloride. The reaction product worked up in the usual manner is a yellow crystalline powder dissolving in concentrated sulphuric acid to give a red solution and dyes cotton clear yellow shades from a brown red vat.

A product dyeing more greenish yellow shades is obtained by the use of 1-chloranthraquinone-2-carboxylic acid chloride instead of anthraquinone-2-carboxylic acid chloride, whereas the acylamino compound produced by means of 1-aminoanthraquinone-2-carboxylic acid chloride dyes clear strong red brown shades.

Example 19

24.7 parts of 4-amino-1.9-anthrapyrimidine are heated to boiling in 250 parts of orthodichlorbenzene after the addition of 35 parts of 4'-bromdiphenyl-4-carboxylic acid chloride until a sample of the reaction product melts at about 310° C. The reaction mixture is then worked up as usual. The dyestuff thus obtained dyes the vegetable fibre from a brown violet vat strong greenish yellow shades.

Similar dyeings are obtained from the acylamines of 4-amino-1.9-anthrapyrimidine produced by means of other diphenyl-4-carboxylic acids substituted in the 4' position, for example the 4'-ethyl, 4'-chloro and 4'-benzoyl derivatives.

The acylamine produced by the action of para-chlorbenzoyl chloride on the anthrapyrimidine produced from 1.4-diamino-β-methoxy anthraquinone with formamide, dyes the vegetable fibre yellow shades which are also obtained by means of the acylamine produced in an analogous manner from para-chlorbenzoyl chloride and the 1.9-anthrapyrimidine derivative produced from 1.4-diamino - 2 - bromanthraquinone or 1.4 - di-amino - 2 - methylanthraquinone and formamide. The anthrapyrimidine derivative produced from 1.4 - diamino - 5 - nitroanthraquinone and formamide furnishes on condensation with benzoyl chloride a dyestuff dyeing reddish yellow shades. The dyestuffs obtainable from 5-amino-1.4-dibenzoyldiaminoanthraquinone and formamide furnishes rose red shades.

Example 20

15 parts of 1-amino-8-benzoylaminoanthraquinone (obtainable by partial benzoylation of 1.8-diaminoanthraquinone) are heated to boiling for several hours with 30 parts of formamide in 60 parts of phenol while distilling off the water formed. When the reaction mixture has become yellow, it is allowed to cool and the 8-benzoylamino-1.9-anthrapyrimidine formed filtered off. It is a powder crystallizing from high boiling solvents in yellow needles, dissolves in concentrated sulphuric acid to give a golden yellow solution and dyes cotton yellow shades from a brown violet vat.

In an analogous manner the (2'.5'-dichlorbenzoyl)-5-amino-1.9-anthrapyrimidine from 1-amino - (2'.5' - dichlorbenzoyl) - 5 - aminoan - thraquinone, the (para-chlorbenzoyl)-4-amino-1.9-anthrapyrimidine from 1-amino-(para-chlorbenzoyl)-4-aminoanthraquinone, the (benzanthraquinone - 6' - carboxyl) - 5 - amino - 1.9 - anthrapyrimidine from 1-amino-(benzanthraquinone-6'-carboxyl)-5-aminoanthraquinone is obtained. The (dichloranthraquinone - 2.1 - benzacridone - 3' - carboxyl) - 4 - amino - 1.9 - anthrapyrimidine is obtained by partial acylation by means of benzoic acid anhydride of the acylamine prepared from 1.4-diaminoanthraquinone and dichloranthraquinone-2.1-benzacridone-3'-carboxylic acid.

The 4-benzoylamino-2-amino - C - phenyl-1.9-anthrapyrimidine is obtained by heating 4-benzoylamino-C-phenyl-2.1-oxazol with ammonia.

Example 21

26.2 parts of 2-amino-C-methyl-1.9-anthrapyrimidine (obtained by heating anthraquinone-C-methyl-2.1-oxazol with ammonia) are heated to boiling for a short time in 200 parts of nitrobenzene with 30 parts of anthraquinone-2-carboxylic acid chloride. The reaction proceeds according to the following formulæ:

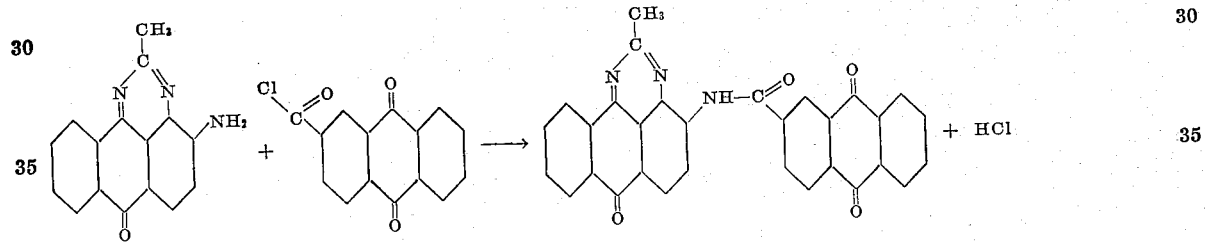

After completion of the reaction which may be recognized by the evolution of hydrogen chloride ceasing, the reaction mixture is worked up as usual. The acylamine obtained in yellow needles dissolves in concentrated sulphuric acid to give a yellow solution and dyes the vegetable fibre yellow shades from a violet brown vat.

The 2 - benzoylamino - C - methyl - 1.9 - an - thrapyrimidine as well as the C-ethyl and the C-propyl derivative likewise dye yellow shades.

The para - chlorbenzoyl - 4 - amino - C - phenyl-1.9-anthrapyrimidine (obtainable by heating 4 - amino - C - phenyl - 1.9 - anthrapyrimidine with para-chlorbenzoyl chloride) dyes cotton reddish yellow shades from a violet vat. The C-naphthyl and the C-para-chlorphenyl derivative dye similar shades as do also the isomeric acylamines of the 5-amino-1.9-anthrapyrimidine series.

Example 22

247 parts of of amino-1.9-anthrapyrimidine are heated to boiling while thoroughly stirring in 1000 parts of nitrobenzene after the addition of 240 parts of crude pyridine and 190 parts of para-chlorbenzoylchloride, the mixture being kept at the said temperature until the separation of dyestuff does not anymore increase. The mixture is then allowed to cool and the reaction product separated in the form of pure yellow needles filtered off. The yield is about that required by theory. The dyestuff is practically identical with the product described in Example 5.

Pyridine alone may also be employed as diluent instead of the mixture thereof with nitrobenzene. It may also be replaced by dimethylaniline or other tertiary bases or other acid binding agents such as sodium carbonate and acetate.

The (diphenyl - para - carboxylic) - 4 - amino - 1.9-anthrapyrimidine dyeing strong clear greenish yellow shades from a violet vat is obtained by heating 4-amino-1.9-anthrapyrimidine and diphenyl-4-carboxylic acid chloride in a mixture of nitrobenzene and pyridine. The acylamines prepared in an analogous manner from 4-amino-1.9-anthrapyrimidine and 4'-nitrodiphenyl-4-carboxylic acid (obtainable by nitration of diphenyl-para-carboxylic acid by means of nitric acid in crude chloroacetic acid) or dichlordiphenyl-4-carboxylic acid (obtainable by chlorinating diphenylcarboxylic acid in trichlorbenzene with chlorine in the presence of iodine at between 135° and 140° C.) or with quinoline-6-carboxylic acid likewise dye yellow shades.

The reaction products may be isolated by distilling off the diluent, if desired under reduced pressure or by means of steam, or by means of steam under reduced pressure. They are readily soluble in some diluents miscible with water, such as chloroacetic acid, and can be reprecipitated from such solutions by dilution with water.

In order to increase the property of printing of the dyestuffs they may be mixed intimately with glycerine or other additions improving the property of printing such as anthraflavinic acid or mixtures of such additions.

Example 23

36 parts of 4-chlor-2-methyl-C-phenyl-1.9-anthrapyrimidine (obtainable by diazotizing 4-amino - 2 - methyl - C - phenyl - 1.9 - anthra - pyrimidine and replacing the diazo group by chlorine) are heated at about 150° C. for about 2 hours in 100 parts of nitrobenzene after the addition of 5 parts of potash, 1 part of copper acetate and 50 parts of para-toluene sulphamide and then heated for several hours at about 180° C. After cooling, the 2-methyl-4-para-toluene sulphamide - C - phenyl - 1.9 - anthrapyrimidine is filtered off. It is a yellow crystalline powder, dissolves in concentrated sulphuric acid to give a brown violet solution and dyes cotton yellow shades from a brown violet vat.

The 4 - para - toluenesulphamide - 2 - methyl - 1.9-anthrapyrimidine obtained in an analogous manner dyes greenish yellow shades.

Example 24

20 parts of 5-amino-4'-benzoylamido-1.1'-anthrimidecarbazol (obtainable by partial saponification by means of sulphuric acid at between 35° and 50° C. of 5.4'-dibenzoyldiamino-1.1'-anthrimidecarbazol) are heated to boiling for several hours with 100 parts of formamide in 200 parts of phenol. The reaction proceeds according to the formulæ:

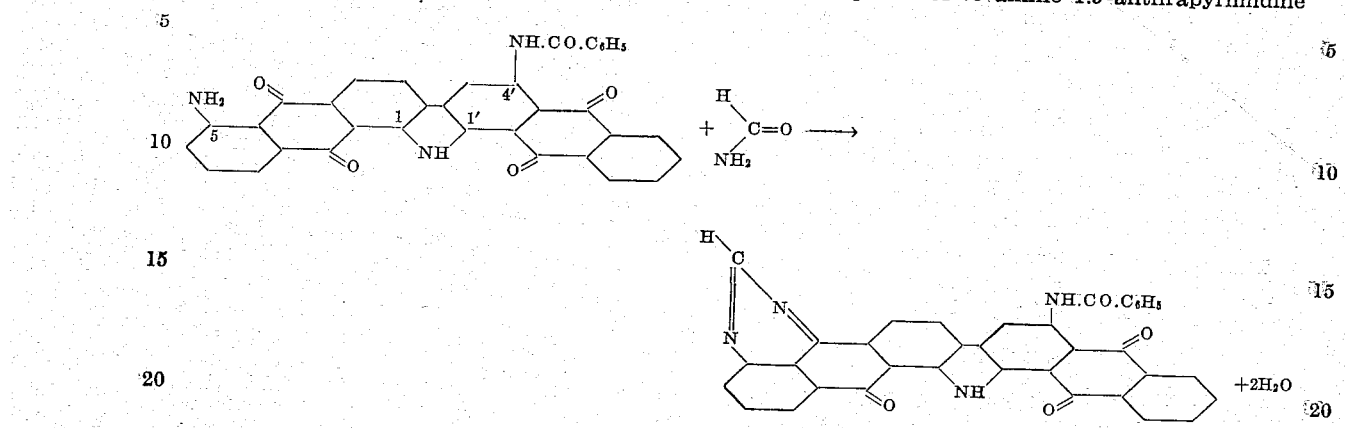

As soon as a sample yields yellow brown dyeings fast to chlorine, the reaction mixture is allowed to cool and the 4-benzoylamino-5.10-pyrimidino-1.1'-anthrimidecarbazol formed filtered off. It is a brown crystalline powder, dissolves in concentrated sulphuric acid to give a red solution and dyes cotton from a brown vat strong yellow brown shades of very good fastness.

A brown dyeing benzoylaminoanthrapyrimidine derivative is obtained in an analogous manner from 5-amino-4'-benzoylamino-8-methoxy-1.1'-anthrimidecarbazol (obtained from 5.4'-dibenzoyl-diamino-8-methoxy-1.1'-anthrimidecarbazol in a manner analogous to that described in the foregoing paragraph.

The reaction product obtained in an analogous manner from 5-amino-5'-benzoylamino-1.1'-anthrimidecarbazol dyes golden orange shades.

By condensation of α-aminoacylaminoanthrimides with formamide in an analogous manner the acylaminopyrimidinoanthrimides are obtained, as are also obtained the benzoylaminopyrimidinoanthrapyrimidines by the action of formamide on α-aminobenzoylaminopyrimidinoanthraquinones.

In the same manner by the action of formamide on other α-aminoacylaminoanthraquinone derivatives, such as the α-aminoacylamino derivatives of benzanthraquinone, dianthraquinonyls, anthraquinoneacridones, phthaloyl carbazol or other carbazols containing the anthraquinone nucleus for example anthraquinonethioazols and the anthraquinoneazines, corresponding acylaminopyrimidine derivatives are obtained.

*Example 25*

100 parts of 5-amino-1.9-anthrapyrimidine are heated for a short time while stirring at between 125° and 130° C. in 500 parts of 2.5-dichlorbenzoylchloride. As soon as the reaction mixture has become pure yellow in color, it is allowed to cool and the excess of dichlorbenzoylchloride filtered off. The 2'5'-dichlorbenzoyl-5-amino-1.9-anthrapyrimidine is identical with the product described in Example 17.

The 5-acetylamino-1.9-anthrapyrimidine is obtained in an analogous manner by heating 5-amino-1.9-anthrapyrimidine in acetic acid anhydride, as is obtained the phenylacetyl-5-amino-1.9-anthrapyrimidine by the action of phenyl acetic acid chloride.

*Example 26*

24.7 parts of 5-amino-1.9-anthrapyrimidine are heated to boiling while stirring in 200 parts of nitrobenzene with 35 parts of 4'-bromdiphenyl-4-carboxylic acid chloride (obtainable by brominating diphenyl-4-carboxylic acid and treating the product with phosphorus pentachloride). When the reaction mixture has become yellow orange, it is allowed to cool and the (4'-bromdiphenyl-4-carboxyl)-5-amino-1.9-anthrapyrimidine separated in yellow needles filtered off. It dyes cotton golden orange shades of very good fastness against washing and boiling with soda. The same product is also obtained by the action of formamide on 5-amino-(4'-bromdiphenyl-4-carboxyl)-1-aminoanthraquinone. In an analogous manner the acylamines of aminoanthrapyrimidines and 4-, 5-, and 8-aminoanthraquinone-1-carboxylic acids can be prepared. The latter aminoanthraquinonecarboxylic acids can be obtained by treating the corresponding chloroaminoanthraquinones or chlorbenzoylaminoanthraquinones with cuprous cyanide and subsequent saponification.

*Example 27*

18 parts of (1'-benzene-4'-carboxylic acid chloride)-1-aminoanthraquinone (obtainable by condensation of 1-chloranthraquinone with para-aminobenzoic acid and treating the product with thionyl chloride) are heated to boiling for a short time in 500 parts of nitrobenzene after the addition of 12 parts of 4-amino-1.9-anthrapyrimidine and allowed to cool after the evolution of hydrogen chloride has ceased. The reaction product recovered in the usual manner dissolves in concentrated sulphuric acid to give a yellow solution and dyes cotton red orange shades of good fastness from a brown violet vat. Instead of para-aminobenzoic acid other carboxylic acids of aromatic amines may be used for the preparation of the acylating component such as aminoanthraquinone carboxylic acids or pyrimidinoanthraquinone carboxylic acids.

*Example 28*

10 parts of 5-aminoanthraquinone-2.1'-carbaminoanthraquinone (obtainable by acylating α-aminoanthraquinone with 5-nitroanthraquinone-2-carboxylic acid and reducing the acylation product) are heated to boiling for several hours with 200 parts of formamide in 400 parts of phenol. The reaction proceeds according to the following formulæ:

dine (obtainable by brominating 5-amino-1.9-anthrapyrimidine in chlorsulphonic acid) are heated

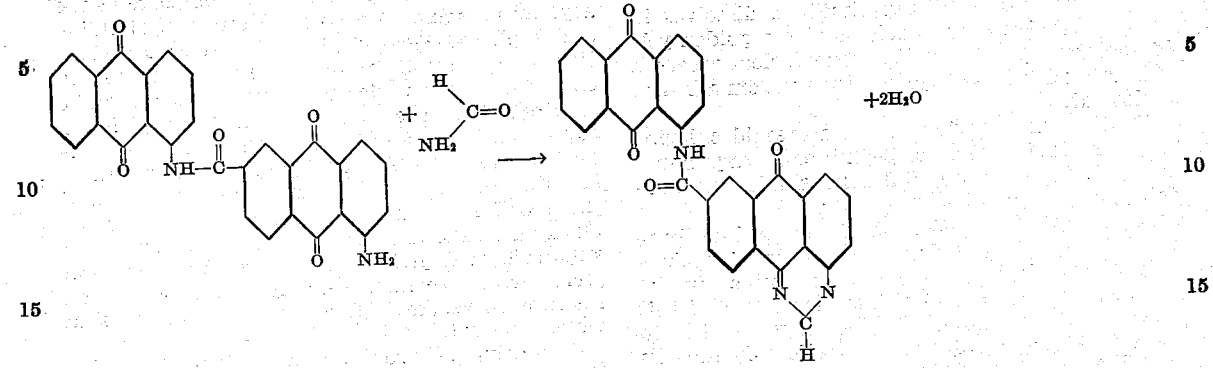

The reaction mixture is then diluted with ethyl alcohol and worked up as usual. The reaction product, the 1'-anthraquinone-2-carbamino-5.10-anthrapyrimidine, is a brown yellow powder which is difficultly soluble and may be purified by means of oxidizing agents, for example by means of an alkali metal hypochlorite. It dissolves in concentrated sulphuric acid to give an olive yellow solution and furnishes yellow dyeings on cotton from a brown violet vat.

The reaction may also be carried out in trichlorbenzene or nitrobenzene. An addition of boric oxide, zinc chloride or copper salts accelerates the reaction. Similar reaction products are obtained in an analogous manner by treating acylamines of other α-aminoanthraquinone carboxylic acids with formamide.

In the same manner α-aminoacylaminopyrimidinoanthraquinone may be converted by means of formamide into acylaminopyridinoanthrapyrimidines.

Example 29

100 parts of 3-amino-1.9-anthrapyrimidine (obtainable by condensation of 1.3-diaminoanthraquinone with formamide) are heated to boiling in 1000 parts of nitrobenzene with 120 parts of para-chlorbenzoylchloride until the coloration of the reaction mixture has become olive yellow. After cooling, the reaction product separated in crystalline form is filtered off. It dissolves in concentrated sulphuric acid to give a golden yellow solution and dyes cotton yellow shades from a brown vat. The reaction product obtained by acylation of 6-amino-1.9-anthrapyrimidine by means of para-chlorbenzoylchloride dyes yellow shades.

The product obtained by acylation of diamino-1.9-anthrapyrimidine (prepared by condensing the dichloranthrapyrimidine, produced by chlorinating 5-chlor-anthrapyrimidine in trichlorbenzene in the presence of iodine, with para-toluene sulphamide and saponification by means of sulphuric acid) by means of benzoyl chloride dyes orange shades. The product obtained by acylating by means of 1-aminoanthraquinone-2-carboxylic acid chloride the polyamino-1.9.5.10-anthradipyrimidine (obtainable by chlorinating 1.9.5.10-anthradipyrimidine which may be produced by acting on 1.5-diaminoanthraquinone with formamide, condensing the chlorination product with para-toluene sulphamide and saponifying the condensation product by means of sulphuric acid) dyes brown shades.

Example 30

325 parts of bromo-5-amino-1.9-anthrapyrimito boiling for a short time in 3000 parts of nitrobenzene with 220 parts of 2.5-dichlorbenzoyl chloride after the addition of 100 parts of calcined soda. After cooling the reaction mixture is worked up as usual. The dyestuff obtained dissolves in concentrated sulphuric acid to give a golden yellow solution and furnishes yellow dyeings of a very good fastness from a brown violet vat.

The 5-benzoylamino-β-naphthoylamino-1.9-anthrapyrimidine is obtained in an analogous manner by the action of β-naphthoyl chloride on amino-5-benzoylamino-1.9-anthrapyrimidine which may be prepared by condensing the aforesaid brom-5-aminoanthrapyrimidine with para-toluene sulphamide, benzoylating the product thus obtained and partially saponifying the latter product.

A similar reaction product is also obtained by treating 1 molecular proportion of the corresponding diamino-1.9-anthrapyrimidine with 1 molecular proportion of benzoyl chloride and 1 molecular proportion of β-naphthoyl chloride. A reaction product is obtained in the form of orange needles dyeing cotton orange shades from a brown violet vat by reaction of parachlorbenzoyl chloride on polychlor-5-amino-1.9-anthrapyrimidine which may be prepared by saponification by means of sulphuric acid of the chlorination product of 5-benzoylamino-1.9-anthrapyrimidine.

Example 31

24.7 parts of 2-amino-C-phenyl-1.9-anthrapyrimidine are heated to boiling for a short time in 250 parts of nitrobenzene with 30 parts of anthraquinone-1-sulpho chloride. After cooling the acylation product is filtered off. It is a yellow powder, dyes cotton yellow shades from a brown vat and dissolves in concentrated sulphuric acid to give a golden yellow solution.

A similar reaction product is obtained by the employment of the isomeric anthraquinone-2-sulpho chloride. Yellow dyeing acylation products are obtained in an analogous manner by the action of benzene-, o-, or p-toluene sulpho chloride on 7-amino-1.9-anthrapyrimidine.

Identical reaction products are obtained by condensation of the corresponding halogen anthrapyrimidines with the corresponding sulphamides.

Example 32

36.7 parts of 4-benzoylamino-1.9-anthrapyrimidone are heated for several hours, while stirring, at between 130° and 135° C. in 200 parts of nitrobenzene with 22 parts of phosphorus pentachloride. After completion of the reaction the reaction mixture is worked up in the usual manner. The reaction product which according to analysis is a C-chlor-4-benzoylamino-1.9-anthrapyrimidine, dissolves in concentrated sulphuric acid to give a golden yellow solution and dyes cotton strong, clear greenish yellow shades of very good fastness from a brown violet vat.

By the condensation of the aforesaid chlorination product with α- or β-aminoanthraquinones new dyestuffs dyeing different shades are obtained.

By treating the 5-benzoylamino-1.9-anthrapyrimidone (obtainable by condensing 1-amino-5-benzoylaminoanthraquinone with urea) in the manner described in the first paragraph of this example a dyestuff is obtained crystallizing in yellow needles and furnishing yellow dyeings on cotton.

C-chlor-8-2′.5′-dichlorbenzoylamino-1.9-anthrapyrimidine is obtained in an analogous manner by treating 8-2′.5′-dichlorbenzoylamino-1.9-anthrapyrimidone with phosphorus pentachloride. It dyes the vegetable fibre yellow shades from a dark violet vat.

Substitution products of the aforesaid 4-, 5- and 8-benzoylamino-1.9-anthrapyrimidones may be subjected to chlorination in the aforedescribed manner, for example the 5-benzoylamino-8-methoxy-1.9-anthrapyrimidone, the 1.4-dibenzoyldiamino-5.10-anthrapyrimidone (obtainable from 5-amino-1.4-dibenzoyldiaminoanthraquinone), the 4-benzoylamino-3-methyl-1.9-anthrapyrimidone (from 1-amino-4-benzoylamino-3-methylanthraquinone), the acylaminoanthrapyrimidones substituted in the acyl radical, such as the chlorbenzoylamino-, nitrobenzoylamino-, alkylbenzoylamino-, alkoxybenzoylamino-, phenylbenzoylamino- and arylaminoanthrapyrimidones. To the aforesaid chlorination also acyl derivatives of aminoanthrapyrimidones and other acids may be subjected, for example such as are obtainable by means of naphthoic acids, benzophenone carboxylic acid, diarylethercarboxylic acids, for example diphenylethercarboxylic acids, diarylsulphide carboxylic acids, for example diphenyl sulphide carboxylic acids, the carboxylic acids of anthraquinones benzanthrones, benzanthraquinones, acridones, anthraquinoneacridones, anthraquinonethioxanthones, anthanthrones, allo-ms-naphthodianthrones and the like or aliphatic or cycloaliphatic carboxylic acids for example acetic acid, oxalic acid, succinic acid and hexahydrobenzoic acid.

Example 33

200 parts of 5-benzoylamino-1.9-anthrapyrimidine in 1000 parts of trichlorbenzene are heated to 140° C. after the addition of 5 parts of iodine and are kept at the said temperature for from 2 to 3 hours while leading in chlorine. The reaction mixture is allowed to cool and the reaction product which has separated in the form of orange red crystals is filtered off by suction. It dissolves in concentrated sulphuric acid giving an orange coloration and dyes vegetable fibres clear, powerful golden orange shades of very good fastness from a brown violet vat.

The corresponding chlorination product of 4-benzoylamino-1.9-anthrapyrimidine gives green yellow dyeings, that of 2-anthraquinone-β-carbamino-C-phenyl-1.9-anthrapyrimidine gives yellow dyeings as does also that of 5-(2′.5′-dichlor-benzoyl)-amino-1.9-anthrapyrimidine.

Example 34

100 parts of a 10 per cent aqueous paste of the acylamine from 4-amino-1.9-anthrapyrimidine and diphenyl-4-carboxylic acid, after an addition of 30 parts of bromine, are heated to boiling on a waterbath under a reflux condenser while stirring. When a sample withdrawn yields a dyeing entirely stable to chlorine (which is usually the case after a few hours) the excess of bromide is removed by the usual methods and the reaction product containing bromine is filtered off by suction. It dissolves in concentrated sulphuric acid giving an orange coloration and yields greenish yellow clear dyeings of very good fastness on vegetable fibres from a cold or warm violet blue vat.

Similarly, the bromination product obtainable in a corresponding manner from the isomeric dyestuff from 5-amino-1.9-anthrapyrimidine is superior in its fastness to washing and boiling with soda to the dyestuff free from bromine.

Example 35

50 parts of the initial material employed in paragraph 1 of Example 34 are suspended in 500 parts of nitrobenzene. After adding 1.5 parts of iodine and 75 parts of sulphuryl chloride, the suspension is heated to 80° C. while stirring, kept at the said temperature for from 3 to 4 hours, heated for from 1 to 2 hours at 90° C. and then allowed to cool. The chlorination product formed is filtered off by suction. It is a yellow crystalline powder which dissolves in concentrated sulphuric acid giving an orange coloration and dyes cotton clear, powerful yellow shades entirely fast to chlorine and washing from a blue violet vat.

Example 36

100 parts of 5-benzoylamino-1.9-anthrapyrimidine are introduced at from 0° to 5° C. while stirring into a suspension of 100 parts of bromine and 3 parts of iodine in 1000 parts of chlorsulphonic acid. The whole is heated to from 20° to 30° C. and kept at this temperature for about 2 hours; the reaction product is then worked up by precipitation in water and filtration by suction. The resulting bromination product yields orange dyeings on cotton from a brown violet vat.

Example 37

25 parts of 2-amino-1.9-anthrapyrimidine are heated to boiling for a short time in 200 parts of nitrobenzene with 20 parts of meta-chlorbenzoyl chloride. The meta-chlorbenzoyl-2-amino-1.9-anthrapyrimidine formed is filtered off from the cold reaction mixture. It forms yellow needles, dissolves in concentrated sulphuric acid to give a yellow solution and dyes cotton yellow shades from a brown vat.

Similarly dyeing products are obtained by the use of an equivalent amount of 2.5-dichlor-, 2.3-dichlor-, 3.4-dichlor or trichlorbenzoyl chloride instead of the 20 parts of meta-chlorbenzoyl chloride. By the action of halogentoluic acid chloride or halogenterephthaloyl chloride on 2-amino-1.9-anthrapyrimidine likewise products are obtained dyeing yellow shades.

What we claim is:—

1. A process of producing coloring matters, which comprises condensing an aminoanthrapyrimidine with an organic acylating agent.

2. A process of producing coloring matters, which comprises condensing an aminoanthrapyrimidine with an organic carboxylic acid chloride.

3. A process of producing coloring matters, which comprises condensing an aminoanthrapyrimidine with an organic carboxylic acid chloride in an inert organic, liquid diluent.

4. A process of producing coloring matters, which comprises condensing an aminoanthrapyrimidine with an organic carboxylic acid chloride above 100° C. in an inert organic, liquid diluent.

5. A process of producing coloring matters, which comprises condensing an aminoanthrapyrimidine with an organic carboxylic acid chloride above 100° C. in an inert organic, liquid diluent in the presence of an acid binding agent.

6. A process of producing coloring matters, which comprises condensing an aminoanthrapyrimidine with an organic carboxylic acid chloride above 100° C. in an inert organic, liquid diluent in the presence of a tertiary base.

7. A process of producing coloring matters, which comprises condensing an aminoanthrapyrimidine with an organic carboxylic acid chloride above 100° C. in an inert organic, liquid diluent in the presence of pyridine.

8. An anthrapyrimidine to which an organic radical is attached by means of an acylamino group which product dissolves in concentrated sulphuric acid to give yellow to red solutions.

9. An anthrapyrimidine to which an organic radical is attached by means of the group

wherein Y stands for hydrogen or an alkyl group which product dissolves in concentrated sulphuric acid to give yellow to red solutions.

10. An anthrapyrimidine derivative corresponding to the formula:

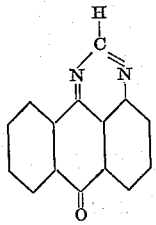

in which up to two hydrogen atoms are replaced by the group

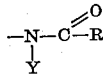

in which Y stands for hydrogen or an alkyl group and R for an organic radical which product dissolves in concentrated sulphuric acid to give yellow to red solutions and dye the vegetable fibre greenish yellow to violet shades from violet brown vats.

11. An anthrapyrimidine derivative corresponding to the formula:

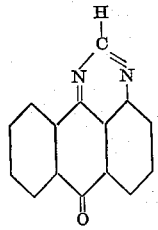

in which up to two hydrogen atoms are replaced by the group

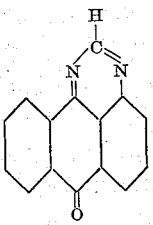

in which R stands for the radical of a cyclic compound containing at least one six-membered ring to which may be attached further rings containing from five to six members, which product dissolves in concentrated sulphuric acid to give yellow to red solutions and dye the vegetable fibre greenish yellow to violet shades from violet brown vats.

12. An anthrapyrimidine derivative corresponding to the formula:

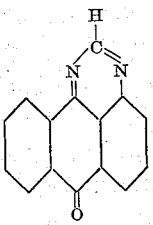

in which up to two hydrogen atoms are replaced by the group

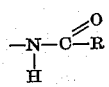

in which R stand for an aromatic radical which product dissolves in concentrated sulphuric acid to give yellow to red solutions and dye the vegetable fibre greenish yellow to violet shades from violet brown vats.

13. An anthrapyrimidine derivative corresponding to the formula:

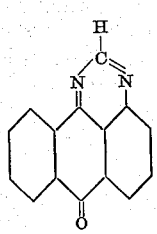

in which up to two hydrogen atoms are replaced by the group

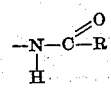

in which R stands for a radical of the benzene series, which product dissolves in concentrated sulphuric acid to give yellow to red solutions and dye the vegetable fibre greenish yellow to orange shades from violet brown vats.

14. An anthrapyrimidine derivative corresponding to the formula:

[structure]

in which up to two hydrogen atoms are replaced by the group $$-\underset{H}{N}-\underset{}{C}\!\!=\!\!O-R$$

in which R stands for a benzene radical substituted by a substituent selected from the group consisting of halogen, cyano, nitro, alkyl, alkoxy, phenyl, amino and substituted amino groups, which product dissolves in concentrated sulphuric acid to give yellow to red solutions and dye the vegetable fibre greenish yellow to orange shades from violet brown vats.

15. An anthrapyrimidine derivative corresponding to the formula:

[structure]

in which up to two hydrogen atoms are replaced by the group $$-\underset{H}{N}-\underset{}{C}\!\!=\!\!O-R$$

in which R stands for a benzene radical substituted by chlorine, which product dissolves in concentrated sulphuric acid to give yellow to red solutions and dye the vegetable fibre greenish yellow to orange shades from violet brown vats.

16. An anthrapyrimidine derivative corresponding to the formula:

[structure]

in which up to two hydrogen atoms are replaced by the group $$-\underset{H}{N}-\underset{}{C}\!\!=\!\!O-R$$

in which R stands for a p-chlorbenzene radical, which product dissolves in concentrated sulphuric acid to give yellow to red solutions and dye the vegetable fibre greenish yellow to orange shades from violet brown vats.

17. An anthrapyrimidine derivative corresponding to the formula:

[structure]

in which up to two hydrogen atoms are replaced by the group $$-\underset{H}{N}-\underset{}{C}\!\!=\!\!O-R$$

in which R stands for a m-chlorbenzene radical, which product dissolves in concentrated sulphuric acid to give yellow to red solutions and dye the vegetable fibre greenish yellow to orange shades from violet brown vats.

18. An anthrapyrimidine derivative corresponding to the formula:

[structure]

in which up to two hydrogen atoms are replaced by the group $$-\underset{H}{N}-\underset{}{C}\!\!=\!\!O-R$$

in which R stands for a 2.5-dichlorbenzene radical, which product dissolves in concentrated sulphuric acid to give yellow to red solutions and dye the vegetable fibre greenish yellow to orange shades from violet brown vats.

19. An anthrapyrimidine derivative corresponding to the formula:

[structure]

in which X stands for hydrogen or an alkyl group, at most two Z's for the acylamino group $$-\underset{H}{N}-\underset{}{C}\!\!=\!\!O-R$$

in which R stands for an aromatic radical and wherein up to two of the remaining Z's may be halogen, the other Z's being hydrogen, which product dissolves in concentrated sulphuric acid to give yellow to red solutions and dye the vegetable fibre greenish yellow to orange shades from violet brown vats.

20. An anthrapyrimidine derivative corresponding to the formula:

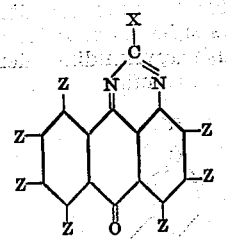

in which X stands for hydrogen or an alkyl group, at most two Z's for the acylamino group

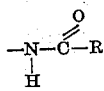

in which R stands for a radical of the benzene series, and wherein up to two of the remaining Z's may be halogen, the other Z's being hydrogen, which product dissolves in concentrated sulphuric acid to give yellow to red solutions and dye the vegetable fibre greenish yellow to orange shades from violet brown vats.

21. An anthrapyrimidine derivative corresponding to the formula:

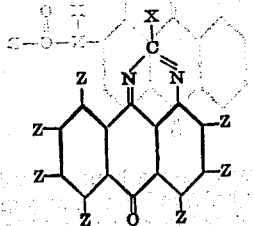

in which X stands for hydrogen or an alkyl group, at most two Z's for the acylamino group

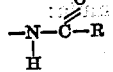

in which R stands for a benzene radical which is substituted by halogen or a cyano group, and wherein up to two of the remaining Z's may be halogen, the other Z's being hydrogen in concentrated sulphuric acid to give yellow to red solutions and dye the vegetable fibre greenish yellow to orange shades from violet brown vats.

22. An anthrapyrimidine derivative corresponding to the formula:

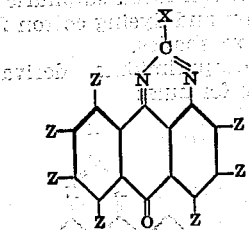

in which X stands for hydrogen or an alkyl group, at most two Z's for the acylamino group

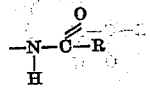

in which R stands for a benzene radical substituted by chlorine, and wherein up to two of the remaining Z's may be halogen, the other Z's being hydrogen in concentrated sulphuric acid to give yellow to red solutions and dye the vegetable fibre greenish yellow to orange shades from violet brown vats.

23. An anthrapyrimidine derivative corresponding to the formula:

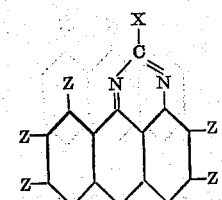

in which X stands for hydrogen or an alkyl group, at most two Z's for the acylamino group

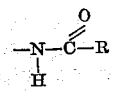

in which R stands for a p-chlorbenzene radical, and wherein up to two of the remaining Z's may be halogen, the other Z's being hydrogen in concentrated sulphuric acid to give yellow to red solutions and dye the vegetable fibre greenish yellow to orange shades from violet brown vats.

24. An anthrapyrimidine derivative corresponding to the formula:

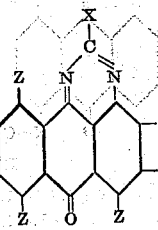

in which X stands for hydrogen or an alkyl group, at most two Z's for the acylamino group

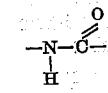

in which R stands for a m-chlorbenzene radical, and wherein up to two of the remaining Z's may be halogen, the other Z's being hydrogen in concentrated sulphuric acid to give yellow to red solutions and dye the vegetable fibre greenish yellow to orange shades from violet brown vats.

25. An anthrapyrimidine derivative corresponding to the formula:

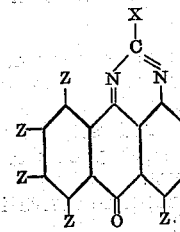

in which X stands for hydrogen or an alkyl group, at most two Z's for the acylamino group

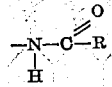

in which R stands for a 2.5-dichlorbenzene radical, and wherein up to two of the remaining Z's may be halogen, the other Z's being hydrogen in concentrated sulphuric acid to give yellow to red solutions and dye the vegetable fibre greenish yellow to orange shades from violet brown vats.

26. An anthrapyrimidine derivative corresponding to the formula:

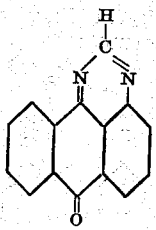

in which a hydrogen atom in one of the alpha-positions is replaced by the acylamino group

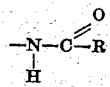

wherein R is an aromatic radical, which products dissolve in concentrated sulphuric acid to give yellow to red solutions and dye the vegetable fibre greenish yellow to violet shades from violet brown vats.

27. An anthrapyrimidine derivative corresponding to the formula:

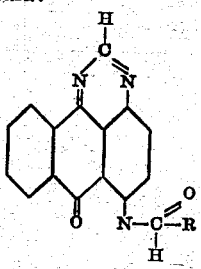

in which R stands for an aromatic radical, which products dissolve in concentrated sulphuric acid to give yellow to red solutions and dye the vegetable fibre greenish yellow to violet shades from violet brown vats.

28. An anthrapyrimidine derivative corresponding to the formula:

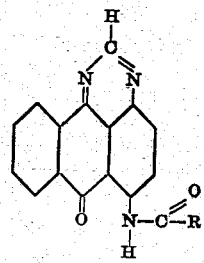

in which R stands for a benzene radical which is substituted by halogen or a cyano group, which products dissolve in concentrated sulphuric acid to give yellow to red solutions and dye the vegetable fibre greenish yellow to orange shades from violet brown vats.

29. An anthrapyrimidine derivative corresponding to the formula:

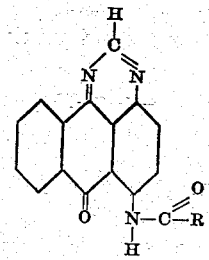

in which R stands for a benzene radical which is substituted by chlorine, which products dissolve in concentrated sulphuric acid to give yellow to red solutions and dye the vegetable fibre greenish yellow to orange shades from violet brown vats.

30. The anthrapyrimidine derivative corresponding to the formula:

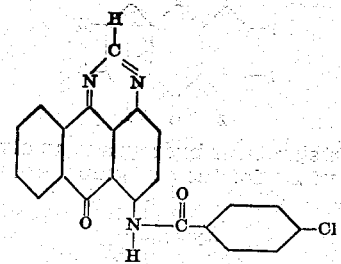

dissolving in concentrated sulphuric acid to give a yellow solution and dyeing cotton from a violet brown vat yellow shades.

31. An anthrapyrimidine derivative corresponding to the formula:

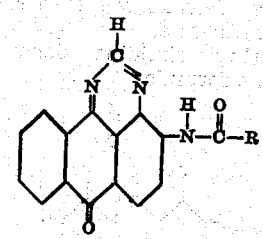

in which R stands for a benzene radical which is substituted by halogen or a cyano group, dissolving in concentrated sulphuric acid to give a yellow solution and dyeing cotton from a violet brown vat yellow shades.

32. The anthrapyrimidine derivative corresponding to the formula:

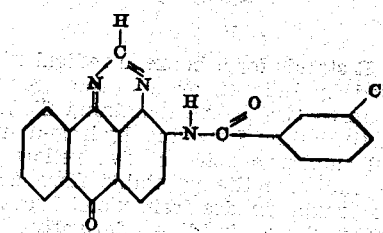

dissolving in concentrated sulphuric acid to give a yellow solution and dyeing cotton from a violet brown vat yellow shades.

33. An anthrapyrimidine derivative corresponding to the formula:

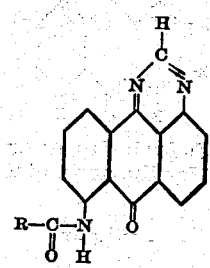

in which R stands for a benzene radical which is substituted by halogen or a cyano group, dissolving in concentrated sulphuric acid to give a yellow solution and dyeing cotton from a violet brown vat yellow shades.

34. An anthrapyrimidine derivative corresponding to the formula:

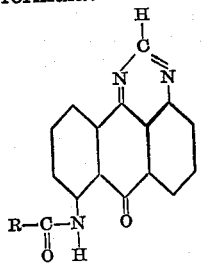

in which R stands for a benzene radical which is substituted by chlorine, dissolving in concentrated sulphuric acid to give a yellow solution and dyeing cotton from a violet brown vat yellow shades.

35. The anthrapyrimidine derivative corresponding to the formula:

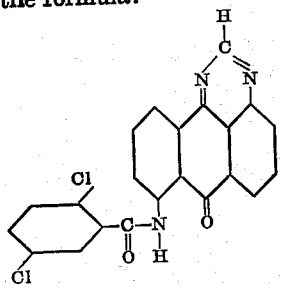

dissolving in concentrated sulphuric acid to give a yellow solution and dyeing cotton from a violet brown vat yellow shades.

MAX ALBERT KUNZ.
KARL KOEBERLE.